Patented Feb. 7, 1950

2,496,634

UNITED STATES PATENT OFFICE 2,496,634

FORTIFYING FEEDS

Daniel Melnick, Kew Gardens Hills, N. Y., assignor, by mesne assignments, to Astrol Products, Inc., New York, N. Y., a corporation of New York No Drawing. Application October 5, 1946, Serial No. 701,404

3 Claims. (Cl. 99—2)

This invention relates to feeds fortified with fat-soluble vitamins, and in particular, is directed to a novel dry composition containing those fat-soluble factors in stable condition; the method of preparing the composition; and a feed ration containing said novel compositions as an ingredient.

Vitamins A, D, E and K are included among the nutrient requirements for the animal organism. Many feeds depend upon natural foods to supply adequate quantities of vitamins A, D, E and K; vitamin D is also furnished in the form of an irradiated sterol.

Vitamin A is naturally present in feeds as the pro-vitamin, carotene. The instability of this factor and the inadequate amount of vitamin A in stored feeds has led to the practice of fortification with fish liver oil, thereby furnishing extra preformed vitamin A. Even under these circumstances, marked, and generally uncontrolled destruction of the vitamin occurs in the fortified feeds so that only a small fraction is retained. Frequently there is almost complete destruction of the vitamin during the storage of the feed. Because of this well-known instability of vitamin A, it is customary to add huge overages of the vitamin in order that the potency of the feed to be stored for a reasonable period of time, may be maintained above a desired minimum level. However, even these huge overages, as demonstrated below, do not accomplish their purpose.

The instability of the fat-soluble vitamins and solutions thereof in the customary vehicles or carriers has long been recognized as a major problem facing feed and vitamin concentrate manufacturers and the users of the products. The concentrates, principally in the form of "feeding oils" are unstable. They lose potency on standing. The deterioration is especially marked when the products are exposed to air. In order to overcome the great instability of these vitamins, especially vitamin A, it has been proposed to incorporate certain, more or less effective, antioxidants in the feeding oils.

In addition to the problem of overcoming the instability of the vitamin when added directly to feeds in the form of fish liver oil or concentrates, there is the problem arising from the fact that such fortification is associated with mechanical difficulties in distributing the vitamins uniformly throughout the mix. A further objection to the direct addition of the oils to feeds is the fact that solidification of the oil during winter months frequently occurs unless precautions are taken to store the material above its freezing point. Holding the oils at room temperature in order to assure fluidity each time that the oils are blended with the dry ingredients is ill advised, since maintenance of the oil at such temperatures results in vitamin A losses before it is even added to the feed.

The other fat-soluble vitamins, D, E, and K, are not as labile as vitamin A. Nevertheless, in the case of vitamin D, reports have appeared indicating that this vitamin also is destroyed during storage of feeds, particularly those containing appreciable quantities of mineral supplements such as ground bone meal or limestone. Although whole grains contribute significant quantities of vitamin E to the ration, it has been recommended that a vitamin E concentrate such as wheat germ oil be included in certain rations where this vitamin is particularly required. Sufficient vitamin K is usually furnished by certain ingredients in the diet. Furthermore, appreciable quantities of this vitamin are produced in the animal organism itself as the result of bacterial synthesis in the digestive tract.

Accordingly, the principal objects of this invention are:

1. The provision of a material containing the fat-soluble vitamins in a stable form.
2. The provision of a dry product containing the fat-soluble vitamins in stable form.
3. The provision of a dry product containing the fat-soluble vitamins which, therefore, can be readily and uniformly blended with other ingredients of a feed.
4. The provision of a product containing the fat-soluble vitamins in stable form and capable of being stored under a broad range of environmental conditions which does not affect the physical state thereof.
5. The provision of a product containing the fat-soluble vitamins in highly stable form which is readily physiologically available to the animal organism.
6. The provision of a mixed feed ration containing fat-soluble vitamins in stabilized conditions.

The foregoing, and other objects which will become apparent from this specification, are attained by the embodiment of a concentration of the fat-soluble vitamins in small solid particles of edible fats which are thoroughly and evenly distributed throughout a finely divided basic material, such as a meal or flour or comparable vehicle, thereby forming a composition or product which may be used for the fortification of feeds.

The objections to the products heretofore known and used are overcome by the composition of this invention in which the fat-soluble vitamins are present in the material in a remarkably stable form. Furthermore, since the composition is a dry powder it may be readily and uniformly blended with the other dry ingredients in the feed, thereby overcoming the vitamin deficiency in some parts of feeds and the unnecessary surplus in other parts of the feeds fortified with the previously known supplements. Also storage under environmental conditions does not affect the physical state of the composition. By means of this composition, it is now possible to store a concentrate of the fat-soluble vitamins in unheated quarters regardless of the environmental temperature with no fear of encountering difficulties for the subsequent use of the material in fortification of feeds. Indeed, storage at lower temperatures is recommended.

Additionally, the vitamins are incorporated in the product in such form that they are readily available to the animal organism.

This invention is particularly advantageous in respect of vitamin A since this vitamin is the most unstable of the fat-soluble vitamins added to feeds.

In order to demonstrate the instability of vitamin A when exposed to air, experiments were conducted, the results of which are hereinafter tabulated. In carrying out these tests, six fish liver oil samples varying in vitamin A content from 28,800 to 199,000 U. S. P. units/gm. were employed. Each oil was exposed to the circulating air in an oven at 45° C. as a film 1.7 mm. in depth. Tests conducted with a large number of pharmaceutical and food preparations have indicated that the holding of samples at 45° C. for a period of 500 hours is equivalent to storage for six months under ordinary conditions. It is to be noted the addition of fish liver oil directly, or fish liver oil contained in carriers, to feeds results in a coating of the dry ingredients with a film of oil of a magnitude which is even less than the 1.7 mm. depth employed in these tests. The results of the tests summarized in Table I emphasizes the marked instability of vitamin A in fish liver oils when exposed to atmospheric oxygen for a short period of time.

TABLE I

*Effect on vitamin A when exposed to air in accelerated holding tests [1]*

| Fish Liver Oil Sample | Initial Vitamin A Content, USP u/gm. | Vitamin A Found [2] After Holding Test | | | | | |
|---|---|---|---|---|---|---|---|
| | | 60 hrs. storage of sample Content Retention | | 96 hrs. storage of sample Content Retention | | 168 hrs. storage of sample Content Retention | |
| | | USP u/gm. | per cent | USP u/gm. | per cent | USP u/gm. | per cent |
| A [3] | 28,800 | 1,440 | 5 | 800 | 3 | | |
| B [3] | 109,000 | 43,700 | 40 | 39,100 | 36 | | |
| C [3] | 113,000 | 85,600 | 76 | 76,000 | 67 | 6,300 | 6 |
| D [4] | 196,000 | 154,000 | 79 | 109,000 | 56 | 3,500 | 2 |
| E [4] | 198,000 | 149,000 | 75 | 123,000 | 62 | | |
| F [5] | 199,000 | 31,400 | 16 | 13,000 | 7 | 3,600 | 2 |

[1] Film of oil, 1.7 mm. in depth, exposed to circulating air in an oven at 45°C.
[2] All assays conducted according to the colorimetric method.
[3] Fish liver oil preparations containing Vitamin A as the natural esters.
[4] Concentrates of distilled vitamin A esters.
[5] Unsaponifiable extracts furnishing the vitamin A as the free alcohol.

In contrast to the marked instability of vitamin A in fish liver oil or concentrates derived therefrom, when exposed as a thin film to air, is the stability of the vitamin A in the product of this invention.

EXAMPLE I

One part, by weight, of fish liver oil of potency in the neighborhood of 200,000 U. S. P. units of vitamin A per gram (oil D of Table I) is dissolved in 50 parts, by weight, of hydrogenated soy oil (iodine value=52; melting point=52° C.) heated to 55° C. The fat is heated slightly above its melting point in order thoroughly to liquefy it. The fish liver oil is stirred in the molten fat to achieve uniform solution, after which the solution is chilled to 5° C., and the solidified, vitamin-containing fat, is flaked and passed through a No. 20 mesh sieve. One part, by weight, of the small granules or particles which pass through the sieve are then thoroughly and uniformly incorporated, as by mixing or the like, into 300 parts, by weight, of a substantially defatted, enzyme-deactivated, soy meal to yield the finished product containing the vitamin in stable form.

The calculated initial vitamin A contained in the finished product was approximately 560 U. S. P. units per gram. The addition of from 0.5 to 1.5 parts, by weight, of the finished product, to 100 parts, by weight, of feed may furnish all the vitamin A required by the animal organism.

EXAMPLE II

A finished product is prepared in accordance with the method of Example I, with the addition of an anti-oxidant such as 0.035 part of nordihydroguaiaretic acid (hereinafter referred to as NDGA) to the melted fat. The granules of the vitamin-containing fat, prepared as in Example I, are incorporated in the soy meal.

The results obtained from tests of the finished product are set forth in Table II below. They indicate that practically no loss of vitamin A occurred in the product even when held for a period of 500 hours under air at 45° C.

TABLE II

*Composition of this invention*

| Formulation | Initial Vitamin A Content, USP u/gm. | Vitamin A Found After Holding Test,[1] 500 hours Content Retention | |
|---|---|---|---|
| | | USP /gm. | per cent |
| 1 part of vitamin A concentrate (Oil D of Table I) plus 50 parts of hydrogenated fat plus 300 parts of soy meal (composition as in Example I) | 577 | 561 | 97 |
| 1 part of vitamin A concentrate (Oil D of Table I) plus 50 parts of hydrogenated fat plus 0.035 part of NDGA plus 300 parts of soy meal (composition as in Example II) | 587 | 571 | 97 |

[1] Sample stored under air at 45° C.

EXAMPLE III

A finished product is prepared in accordance with the general method of Example I, except that 4 parts, by weight, of fish liver oil of potency in the neighborhood of 50,000 units of vitamin A per gram along with 0.035 part of NDGA are dissolved in 46 parts, by weight, of the hydrogenated soy oil for the preparation of the small granules of vitamin-containing fat. The granules are incorporated in the soy meal to form the finished product.

EXAMPLE IV

A finished product is prepared in accordance with the general method of Example I, except that 8 parts, by weight, of fish liver oil of potency in the neighborhood of 50,000 units of vitamin A per gram along with 0.035 part of NDGA are dissolved in 46 parts, by weight, of the hydrogenated soy oil for the preparation of the small granules of vitamin-containing fat, which are subsequently incorporated in the soy meal.

It will be observed that the compositions consist of a base in which there is thoroughly and evenly distributed discrete particles of a high melting, physiologically available, edible fat containing fat-soluble vitamins.

Any edible, physiologically available fat with the proper melting point may be employed provided anti-oxidants are naturally present, as in the case of soy oil, or are artificially added to the fatty material. For the latter purpose, a suitable quantity of an edible anti-oxidant such as NDGA, gum guaiac, tocopherol and the like may be used.

The character of this base is an important feature of this invention. The base must not have a deleterious effect on the stability of the vitamin in the discrete particles. I have found that when materials such as lactose, sucrose, dry skim milk, lactalbumin, starch or pulverized peanut skins are employed as the base in compositions similar to those above described, practically all of the vitamin A (more than 90%) is lost at the conclusion of the accelerated holding tests carried out by the standardized technique described above. Furthermore, when vitamin A either in the form of fish liver oil by itself, or in fluid oil solvents such as cottonseed, menhaden, or sardine oils, is dispersed in the soy meal base, the resulting product is unsatisfactory. Even when the fish liver oil is dissolved in the high melting, physiologically available, edible fat and added in the fluid state to the soy base unsatisfactory retention of vitamin A occurs. The vitamin A must be distributed throughout the soy base as discrete particles. Pertinent data demonstrating each of these important points are set forth in the following table.

TABLE III

*Comparison of the stability of vitamin A in the product of this invention with that in modified formulas omitting essential features*

| Formulation | Initial Vitamin A Content | Vitamin A Found After Holding Tests,[2] 500 Hours Content Retention | |
|---|---|---|---|
| 4 parts of F. L. oil [1] plus 46 parts of hydrogenated fat plus 0.035 part of NDGA; solution chilled, granulated (20 mesh), and then added to 300 parts of soy meal.[3] (Composition as in Example III) | 610 | 566 | 93 |
| 8 parts of F. L. oil [1] plus 46 parts of hydrogenated fat plus 0.035 part of NDGA plus 300 parts of soy flour.[3] (Composition as in Example IV) | 1,140 | 1,020 | 90 |
| 4 parts of F. L. oil [1] alone blended with 300 parts of soy meal [3] | 577 | 39 | 7 |
| 4 parts of F. L. oil [1] plus 0.035 part of NDGA blended with 300 parts of soy meal [3] | 548 | 117 | 21 |
| 4 parts of F. L. oil [1] plus 0.035 part of NDGA blended with 346 parts of soy meal [3] | 504 | 126 | 25 |
| 4 parts of F. L. oil [1] plus 46 parts of cottonseed oil plus 0.035 part of NDGA blended with 300 parts of soy meal [3] | 503 | 31 | 6 |
| 4 parts of F. L. oil [1] plus 46 parts of menhaden oil blended with 300 parts of soy meal [3] | 505 | 13 | 3 |
| 4 parts of F. L. oil [1] plus 46 parts of sardine oil blended with 300 parts of soy meal [3] | 502 | 13 | 3 |
| 4 parts of F. L. oil [1] plus 46 parts of hydrogenated fat plus 0.035 part of NDGA; solution at 55° C. blended in the fluid state with 300 parts of soy meal [3] heated to 55° C; mixture allowed to cool to room temperature. (It contains no discrete fat particles) | 561 | 318 | 57 |

[1] According to colorimetric assay, the F. L. (fish liver) oil contained 50,000 USP units of vitamin A per gram.
[2] Samples stored under air at 45° C.
[3] Both the soy meal and soy flour were products from which most of the oil had been removed by procedures involving heat processing; the products contained no active enzymes. The particles in the meal varied from 20 to 150 mesh and in the flour from 200–350 mesh.

Apparently, there is present in the soy meal an, as yet, unidentified anti-oxidant factor, which only in cooperation with the other elements of this invention, viz., the embodiment of the vitamin A in the high melting, physiologically available, edible fat, and the dispersion thereof as discrete particles in the base stabilizes the vitamin A. No single factor in itself is sufficient to yield a product of satisfactory stability of this labile vitamin.

The only base which in itself has proved satisfactory thus far is defatted, enzyme-inactivated soy meal or flour. However, when the unidentified anti-oxidant factor in soy, or the like, is added to other materials, such other materials may then be employed as the base.

Of especial importance is the following feature of this invention. As shown by the foregoing data which demonstrates the remarkable stability of vitamin A (the most labile of these nutrients) in the composition itself, that stability persists even when the composition is used as an ingredient of a feed mixture. A mixed feed ration containing the fat-soluble product of this invention, possesses a markedly increased retention of the vitamin as contrasted with feed rations prepared from the vitamin fortifying materials heretofore known.

This is illustrated by the data in the following table which demonstrates the excellent degree of retention of vitamin A when this product is used to fortify a feed ration.

TABLE IV

*Stability of vitamin A in poultry feed [1] fortified with the product [2] of this invention*

| Storage of Feed Under Air at 45° C. | Vitamin A in Unfortified Feed | Vitamin A in Fortified Feed | |
|---|---|---|---|
| | | Quantity Found | Retention |
| Hours | USP units/gm. | USP units/gm. | per cent |
| 0 | 0 | 21.0 | 100 |
| 250 | 0 | 16.7 | 80 |
| 500 | 0 | 15.8 | 75 |
| 750 | 0 | 14.2 | 68 |

[1] Composed of the following ingredients:

Whole wheat ---------- 37 parts
Soy meal ---------- 30 parts
Wheat middlings ---------- 20 parts
Oat meal ---------- 10 parts
Bone meal ---------- 1.5 parts
Limestone (CaCO$_3$) ---------- 1.0 parts
Salt (NaCl, iodized) ---------- 0.2 parts
Manganese sulfate (MnSO$_4$.4H$_2$O) ---------- 0.02 parts
Riboflavin ---------- 0.0004 parts (4 mcg./gm.)

Certain ingredients found in most poultry feeds were omitted from the composition since they contain compounds (sterols and carotenoids) which interfere with the colorimetric test.

[2] This product furnished 2100 USP units of vitamin A per gram. For the fortification 1 part of the product was added to 99 parts of the feed. (The product was similar to the composition in Example III except that the vitamin A was furnished by a fish liver oil containing 180,000 USP units per gram.)

It will be noted, as shown in Table IV, that at the end of the first holding period (250 hours under air at 45° C., equivalent to three months storage under ordinary conditions) there was 80% retention of the vitamin A. At the end of the 500 and 750 hour periods of storage, 75% and 68% retention of the vitamin were observed. These data demonstrate that feeds fortified with my novel composition, even to very high levels of fat-soluble vitamin content, retain the major portion of the added vitamin. This is a strikingly marked improvement over the poor stability of vitamin A and D in feeds fortified by the direct addition of fish liver oils.

As stated above, the hydrogenated fat employed as a vehicle for carrying the vitamin A oil has an iodine value of 52 and a melting point of 52° C. On the addition of the 4 parts of fish liver oil to 46 parts of this hydrogenated fat the melting point is reduced to 48.5° C. (119° F.). This high temperature is significant because it indicates that the fat particles can remain discrete even under extreme temperatures of storage on the farm. During the winter season there is no interference with the free flowing property of the novel composition. This is in marked contrast with fish liver oils (as such in liquid oil solution, or in aqueous emulsion) which when stored at very low temperatures, frequently solidify with a resultant increase in the difficulty of using such products in the fortification of feeds or of mashes.

It is noteworthy that the animal organism is able to extract the vitamin A from the hydrogenated fat in the novel composition even though its melting point is above the body temperature. Employing the official U. S. P. XII rat assay for the biological assay of the novel composition, as freshly prepared and after it had been stored for a period of 500 hours under air at 45° C., it was found that the vitamin A was completely available to the animal organism. The results of these tests are set forth in the following table.

TABLE V

*Availability to the animal organism of the vitamin A in the product of the invention*

[Composition as in Example III]

| Sample | Assay for Vitamin A Content | |
|---|---|---|
| | Colorimetric | Biological [1] |
| | USP units/gm. | USP units/gm. |
| Products freshly prepared and then stored under nitrogen at 5° C. until completion of bioassay | 610 | 550 |
| Products first stored for 500 hours under air at 45° C., and then under nitrogen at 5° C. until completion of bioassay | 566 | 500 |

[1] USP XII rat assay.

Since the biological assay has a precision of approximately 20 per cent it may be concluded that all the vitamin A in the product is physiologically available to the animal organism.

I have found that similar stability and availability of vitamin D and the other fat-soluble vitamins is obtained when these were included in the product, made in accordance with the foregoing described method of introducing vitamin A in the composition.

I have also ascertained the effect of increasing the hydrogenation of the fat in which the oil soluble vitamins were incorporated. In one case I have used a hydrogenated fat with an iodine value of 16.7 having a melting point of 60° C.; and in another case a hydrogenated fat with an iodine value of 1.8 having a melting point of 68° C. When these fats were employed for the solution of the fish liver oil to form the discrete particles used in the preparation of compositions similar to those described above, I have found that good vitamin A stability was obtained. However, when these preparations were fed to rats for biological assay, erratic responses were obtained. Some of the animals grew as well as the controls which were fed the vitamin A in ordinary cottonseed oil, whereas others displayed difficulty in extracting the vitamin and subsequently died. Thus, in the assay of the product made with the completely hydrogenated fat (melting point=68° C.) five animals failed to survive the period of the assay despite the fact that they were receiving enough vitamin A in the ration to allow a good rate of growth. The remaining eight animals, on the other hand, were able completely to extract the vitamin A from the hydrogenated fat.

The above experiments demonstrate that the degree of hydrogenation of the fat is critical in the formulation of the composition. The addition of the fish liver oil to hydrogenated fat melting at a temperature appreciable less than 50° C. yields a product in which the fat granules do not remain discrete when stored under warm environmental conditions. Such low melting fats result in a product with decreased vitamin A stability. On the other hand, a more highly hydrogenated fat, i. e., one melting at a temperature appreciably greater than 58° C., yields a product with a limited vitamin A availability.

With respect to the size of the fatty granules, I have found that best results are obtained when they are not larger in size than No. 10 mesh nor smaller than No. 40 mesh. If the granules are too large it becomes more difficult thoroughly and evenly to distribute them in the finely divided meal or flour base. If the granules are too small the stability of the vitamins is reduced, since more vitamin molecules become exposed to surface oxidation.

It will be understood that the foregoing description of the invention is illustrative of its principles, and that materials other than those specifically described may be used, and the same compounded by various techniques without departing from the spirit and the scope of the invention. For example, granules of fat-containing vitamin may be prepared after the vitamins are incorporated in the molten fat by spray cooling, chilling, or flaking and then subjecting same to any suitable manipulation to achieve the requisite particle size.

Having thus described my invention, I claim:

1. A composition for use as a vitamin supplement to furnish the fat-soluble factors in fortifying feeds which comprises in combination: a finely divided base of defatted, enzyme-inactivated soy having distributed therethrough discrete particles of a high melting physiologically available, edible fat embodying a fat-soluble vitamin, the said fat having a melting point ranging from about 52° C. to about 58° C.

2. A composition for use as a vitamin supplement to furnish the fat-soluble factors in fortifying feeds which comprises in combination: a finely divided base of defatted, enzyme-inactivated soy having distributed therethrough discrete particles of a high melting physiologically available, edible fat embodying a fat-soluble vitamin, the said fat having a melting point ranging from about 52° C. to about 58° C., and the particles having a mesh size ranging from about No. 10 to about No. 40 mesh.

3. A composition for use as a vitamin supplement to furnish the fat-soluble factors in fortifying feeds which comprises in combination: a finely divided base having distributed therethrough an anti-oxidant of the class present in soy meal and discrete particles of a high melting, hydrogenated soy oil embodying a fat-soluble vitamin.

DANIEL MELNICK.

REFERENCES CITED

The following references are of record in the file of this patent:

UNITED STATES PATENTS

| Number | Name | Date |
|---|---|---|
| 2,283,531 | Briod | May 19, 1942 |
| 2,333,658 | Mattill | Nov. 9, 1943 |
| 2,349,590 | Hickman | May 23, 1944 |
| 2,401,293 | Buxton | June 4, 1946 |
| 2,426,762 | Chanin | Sept. 2, 1947 |